(12) United States Patent
Thorausch

(10) Patent No.: US 9,719,594 B2
(45) Date of Patent: Aug. 1, 2017

(54) METHOD AND DEVICE FOR SUPPORTING A DRIVER OF A MOTOR VEHICLE

(71) Applicant: GM GLOBAL TECHNOLOGY OPERATIONS LLC, Detroit, MI (US)

(72) Inventor: Marc Thorausch, Wiesbaden (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 109 days.

(21) Appl. No.: 14/724,164

(22) Filed: May 28, 2015

(65) Prior Publication Data

US 2015/0345636 A1    Dec. 3, 2015

(30) Foreign Application Priority Data

May 28, 2014    (DE) .................. 10 2014 008 044

(51) Int. Cl.
*F16H 63/42*    (2006.01)
*F16H 61/18*    (2006.01)
*F16H 59/44*    (2006.01)

(52) U.S. Cl.
CPC .............. *F16H 63/42* (2013.01); *F16H 61/18* (2013.01); *F16H 59/44* (2013.01); *F16H 2063/426* (2013.01)

(58) Field of Classification Search
None
See application file for complete search history.

(56) References Cited

U.S. PATENT DOCUMENTS

| 4,564,906 A | 1/1986 | Stephan et al. |
| 5,020,361 A * | 6/1991 | Malecki ............. B60R 16/0236 |
| | | 116/DIG. 20 |
| 5,719,765 A | 2/1998 | Book |
| 7,167,085 B2 | 1/2007 | Meyer et al. |
| 7,522,034 B1 * | 4/2009 | Price ...................... F16H 63/42 |
| | | 340/438 |

(Continued)

FOREIGN PATENT DOCUMENTS

| DE | 102013001019 A1 | 7/2014 |
| EP | 2360397 A2 | 8/2011 |
| GB | 2461299 A | 12/2009 |

OTHER PUBLICATIONS

DE102013001019 translation.*
German Patent Office, German Action with Search Results for German Application No. 102014008044.7, dated May 11, 2015.

*Primary Examiner* — Ramya Burgess
*Assistant Examiner* — Timothy M Hannon
(74) *Attorney, Agent, or Firm* — Lorenz & Kopf LLP

(57) ABSTRACT

A method for supporting a driver of a motor vehicle in which a quantity of permissible end positions of an in particular manual gear shift of the motor vehicle is determined and a manual gear shift actuation is detected. A target position of the manual gear shift actuation is determined, and a warning is output when the target position does not belong to the quantity of the permissible end positions. A gear shift actuation and gear shift movement of manual gear shift of the motor vehicle may also be determined. The gear shift movement path may include a starting position, an end position and a movement from the starting position into the end position, as a function of the gear shift actuation. The gear shift movement path is displayed in a graphic of a gear shift of the motor vehicle.

15 Claims, 2 Drawing Sheets

(56) References Cited

U.S. PATENT DOCUMENTS

| | | | |
|---|---|---|---|
| 2008/0007393 A1* | 1/2008 | Kanzaka | B60K 35/00 340/441 |
| 2009/0030584 A1 | 1/2009 | Meng | |
| 2009/0146798 A1* | 6/2009 | Gencyuz | F16H 59/02 340/456 |
| 2011/0043348 A1* | 2/2011 | Blackard | F16H 63/42 340/439 |
| 2011/0260850 A1* | 10/2011 | Ringenwald | B60K 35/00 340/461 |
| 2012/0137811 A1 | 6/2012 | Lindner et al. | |
| 2014/0167948 A1* | 6/2014 | Mejia | B60K 37/02 340/441 |
| 2014/0236441 A1* | 8/2014 | Sato | B60K 23/00 701/64 |
| 2015/0151754 A1* | 6/2015 | Han | B60W 30/16 701/96 |

* cited by examiner

METHOD AND DEVICE FOR SUPPORTING A DRIVER OF A MOTOR VEHICLE

CROSS-REFERENCE TO RELATED APPLICATION

This application claims priority to German Patent Application No. 102014008044.7, filed May 28, 2014, which is incorporated herein by reference in its entirety.

TECHNICAL FIELD

This application pertains to a method, device and computer program product for supporting a driver of a motor vehicle, and in particular for facilitating optimal gearing of a manual gear shift.

BACKGROUND

A system having a shift lever is disclosed in GB 2 461 299, which is provided with a shifting pattern including LEDs. The system determines an optimal gear indicating the same by flashing of the LED assigned to it. A currently engaged gear is indicated by a continuously illuminated LED.

WO 03/102449 A2 discloses a visual display device of a selector lever arrangement, which includes at least two display elements arranged in different display positions. During the operation of the display device a symbol assigned to a current shifting state is always displayed by the first display element.

SUMMARY

In accordance with the present disclosure, a system is provided to better support a driver in actuating a motor vehicle. In one aspect, a method for supporting a driver of a motor vehicle with an in particular manual gear shift is disclosed. A quantity of permissible end positions of the gear shift of the motor vehicle is determined, and a manual gear shift actuation is detected. A target position of the manual gear shift actuation is determined, and a warning is output when the target position does not belong to the quantity of the permissible end positions. As a result, the risk that an unsuitable gear is engaged—in particular by an inexperienced driver and/or inadvertently—can be reduced in an embodiment.

The quantity of the permissible end positions may be determined in an embodiment based on a detected speed of the motor vehicle. In a further development, the quantity of the permissible end positions includes only one or multiple reversing gears when the detected speed of the motor vehicle is negative or directed in the direction from the vehicle front to the vehicle rear. As a result, the risk that a forward gear is engaged—in particular by an inexperienced driver and/or inadvertently—while the vehicle rolls backwards can be reduced in an embodiment.

Additionally or alternatively, the quantity of the permissible end positions in a further development only includes one reverse gear and one or multiple lowest forward gears when the detected speed of the motor vehicle is at least substantially equal to zero or does not exceed a predetermined tolerance value in the amount. As a result, the risk that the vehicle is driven off in a gear that is too high—in particular by an inexperienced driver and/or inadvertently—can be reduced in an embodiment.

Additionally or alternatively, the quantity of the permissible end positions in a further development includes only one or multiple higher forward gears when the detected speed of the motor vehicle exceeds a predetermined limit value. As a result, the risk that a gear that is too low is downshifted—in particular by an inexperienced driver and/or inadvertently—can be reduced in an embodiment.

Additionally or alternatively, the quantity of the permissible end positions in an embodiment can be determined based on a detected current position of the gear shift of the motor vehicle. In a further development, the quantity of the permissible end positions includes only one or multiple forward gears when the detected current position of the gear shift is assigned to an in particular higher forward gear. As a result, the risk that a reverse gear is engaged—in particular by an inexperienced driver and/or inadvertently—can be reduced in an embodiment.

A manual gear shift actuation in an embodiment can be detected based on a detection of a position and/or movement of an actuator of the motor vehicle, in particular of a gear selector lever, a shifting rod operationally connected to the same or the like, in particular a manual gear shift actuation can be such a detected position and/or movement.

The target position of the manual gear shift actuation is determined in an embodiment based on this detected position and/or movement, in particular determined in advance or estimated. In a further development, a gear or a gear stage of the gear shift is determined as target position when a gate member of the gear shift approaches a position or shifting slots in a shifting gate of the gear shift assigned to the gear stage, in particular undershoots a predetermined distance from this position or shifting slot, and/or when the gate member enters a shifting slot of the shifting gate assigned to this gear stage. For example, on approaching or entering a shifting slot, which is only assigned a reverse gear stage, this reverse gear stage can be determined as target position. If the gate member is situated in a shifting slot which is assigned two gear stages, one of the two gear stages whose assigned position in the shifting gate the gate member approaches or is nearer to can be determined as target position.

In an embodiment, the warning is output visually. It can be output in particular by displaying a corresponding symbol, such as a graphic of the gear shift of the motor vehicle. According to the further aspect of the present disclosure explained in the following, for example by highlighting, emphasizing, coloring, flashing, framing or the like of an element of the graphic that is assigned to the target position, such as a number symbol of a gear stage assigned to the target position. As a result, the driver, in an embodiment, can be provided with intuitive and/or unambiguous information regarding the impermissible target position.

Additionally or alternatively the warning in an embodiment can be output acoustically, in particular by one or multiple, in particular continuous and/or actuating element of the motor vehicle, in particular of a gear shift lever, steering wheel, seat or the like. As a result, a driver who does not have a display in his vision can also be warned in an embodiment.

Additionally or alternatively the warning in an embodiment can be output haptically, in particular by continuous and/or in intensifying vibrating of an actuating element of the motor vehicle, in particular of a gear shift lever, steering wheel, seat or the like. As a result, a driver who does not have a display in his vision can also be warned in an embodiment.

In an embodiment, determining the quantity of the permissible end positions can be implemented by determining the complementary quantity of the impermissible end positions, the outputting of a warning when the target position does not belong to the quantity of the permissible end positions, then accordingly by outputting the warning when the target position belongs to the quantity of the impermissible end positions. Thus, instead of a reverse gear as (only) permissible target position, the quantity of the impermissible end positions for example can thus include all forward gears and accordingly the warning may be output when the target position belongs to this quantity of the impermissible end positions or is a forward gear.

In an embodiment, the warning is already output before the gear shift is in the target position or has reached the same. As a result, the driver in an embodiment can be timely warned in particular before the impermissible gear is in particular actually and/or completely engaged. Additionally or alternatively, the warning can be further output preferably intensified or increasingly, for example through a rising volume of an acoustically output warning, other symbols of a visually output warning or more intensive vibrating of a haptically output warning when the gear shift is already in the target position or has reached the same. Equally, the warning can also be omitted.

A device is also disclosed for supporting a driver of a motor vehicle with an in particular manual gear shift. The device includes a controller configured to determine a quantity of the permissible end positions of the gear shift and a target position of the manual gear shift actuation. A sensor detects a manual gear shift actuation, and a display outputs a warning when the target position does not belong to the quantity of the permissible end positions.

In an embodiment, the device or its means are equipped, in particular program-technically, for carrying out a method described herein. According to a further aspect of the present disclosure, which is combined with the aspect explained above in an embodiment, a method for supporting a driver of a motor vehicle with an in particular manual gear shift includes determining a gear shift actuation of the gear shift, determining a gear shift movement path having a starting position, an end position and a movement from the starting position into the end position, as a function of the gear shift actuation, and displaying the gear shift movement path in a graphic of a gear shift of the motor vehicle.

As a result, an instruction for a determined gear shift actuation, in particular recommended by a driver assistance system, can be given to an inexperienced driver in a better, more failsafe and/or more intuitive manner than is the case by the pure display of an end position or of a possible shifting path.

In an embodiment, the gear shift actuation is determined based on a detected current position of the gear shift, for example on the basis of a position and/or movement of an actuator of the motor vehicle, in particular of a gear selector lever, a shifting rod or the like that is operationally connected to the gear shift lever, in particular the gear shift actuation can be such a detected position and/or movement. As a result, an inexperienced driver in an embodiment can be instructed to perform a concrete gear shift actuation to be physically implemented starting out from the current position of the gear shift.

Additionally or alternatively, the gear shift actuation in an embodiment is determined based on an end position of the gear shift, which in a further development is determined based on the detected current position of the gear shift. The end position in an embodiment is a permissible end position, in particular an end position recommended in particular by a driver assistance system. As a result, an inexperienced driver can be instructed to physically perform a concrete gear shift actuation into a permissible or recommended position of the gear shift.

If, for example, a driver assistance system determines upshifting into a higher gear stage, wherein one or multiple gear stages based on a current speed and gear stage, which are located between the current and the recommended gear stage, an inexperienced driver can be instructed to perform an in particular optimal gear shift actuation to be physically realized in a more failsafe and/or intuitive manner without the driver unnecessarily shifting into the gear stages to be skipped. Conversely, step by step downshifting can also be instructed for example in order to utilize an exhaust brake when the driver assistance system based on a predetermined set point speed recommends downshifting into a lower gear stage, wherein one or multiple gear stages are situated between the current and this recommended gear stage.

In an embodiment, the graphic is only displayed temporarily. As a result, a deflection of the driver can be avoided in an embodiment through a permanently displayed graphic and the graphic be displayed to suit requirements. In a further development, the graphic and/or the gear shift movement path are displayed as a function of an actuation of an actuator of the motor vehicle, such as a clutch pedal, a touch and/or movement of a gear selector lever, of an accelerator pedal, of a steering wheel or the like and/or as a function of a gear change recommendation of a driver assistance system of the motor vehicle. As a result, the display in an embodiment can take place to suite requirements.

In an embodiment, the graphic and/or the gear shift movement path, exclusively or in addition, can be displayed when, for as long as a driver assistance system of the motor vehicle recommends a gear shift actuation and/or the driver actuates, touches, or moves a gear selector lever and/or a clutch pedal.

In an embodiment, the graphic is displayed on a windshield or an instrument panel of the motor vehicle. As a result, the driver, in an embodiment, can perceive the display without having to take the eyes off the road for an unnecessarily long time. In particular then is it advantageous to display the graphic and/or the gear shift movement path to suit requirements, only temporarily, and preferably as a function of an actuation of an actuator of the motor vehicle and/or of a gear change recommendation of a driver assistance system.

In an embodiment, the graphic is designed geometrically similar to a gate of the gear shift. As a result, the inexperienced driver can be better given an instruction, in a more failsafe and/or more intuitive manner. In an embodiment, the graphic is designed by a congruent depiction of the gate of the gear shift with following distortion and/or stylization. In an embodiment, the graphic includes a selection slot symbol and multiple shifting slot symbols which can be arranged at a right angle to the selection slot symbol.

In an embodiment, the displayed gear shift movement path includes a directional symbol, for example an arrow or the like. As a result, the in particular inexperienced driver in an embodiment can be better given an instruction, in particular in a more failsafe and/or more intuitive manner.

In an embodiment, the gear shift movement path displayed on the graphic is superimposed on the graphic so that it advantageously is more clearly noticeable. In another embodiment, the graphic conversely is superimposed on the gear shift movement path displayed on the graphic, so that the graphic is advantageously noticeable even when the gear shift movement path is displayed.

In an embodiment, a current position of the gear shift is determined and the starting position of the displayed gear shift movement path changed as a function of this current position, while the gear shift movement path is displayed. As a result, the starting position of the displayed gear shift movement path in an embodiment migrates along with the current position of the gear shift. As a result, the inexperienced driver in an embodiment can be better given an instruction in a more failsafe and/or intuitive manner.

Furthermore, a device for supporting a driver of a motor vehicle with a manual gear shift is proposed. The device includes a controller configured to determine a gear shift actuation and a gear shift movement path, which includes a starting position, an end position and a movement from the starting position into the end position, as a function of the gear shift actuation. A display shows the gear shift movement path in a graphic of a gear shift of the motor vehicle. In an embodiment, the device or its means are equipped in particular program-technically to carry out a method described here.

A means in terms of the present disclosure can be designed hardware and/or software-based, such as a digital processing unit, and in particular microprocessor unit (CPU) that is preferably data or signal connected to a storage and/or bus system and/or one or multiple programs or program modules. The CPU can be designed in order to execute commands which are implemented as a program stored in a storage system, to detect input signals from a data bus and/or output signals to a data bus. A storage system can include one or multiple in particular different storage media, in particular optical, magnetic, solid-state and/or other non-volatile media. The program can be of such a nature that it embodies or is able to carry out the method described here, so that the CPU can execute the steps of such methods and thereby in particular output the warning and/or the display the gear shift movement path.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

A motor vehicle, which is otherwise not shown, includes a gear shift having a shifting gate 21, in which a gear selector lever 22 is guided. With specific reference to FIG. 1, the shifting gate 21 in a manner known per se include a horizontal selector slot and a single-stage left and vertical shifting slot which is assigned a reverse gear, a two-stage vertical shifting slot adjacent to the same, which is assigned a lowest first and second forward gear, a further two-stage vertical shifting slot adjacent to the same, which is assigned a third and a fourth forward gear, and a further two-stage vertical shifting slot adjacent to the same, which is assigned a fifth and a highest, sixth forward gear.

Figure 1:
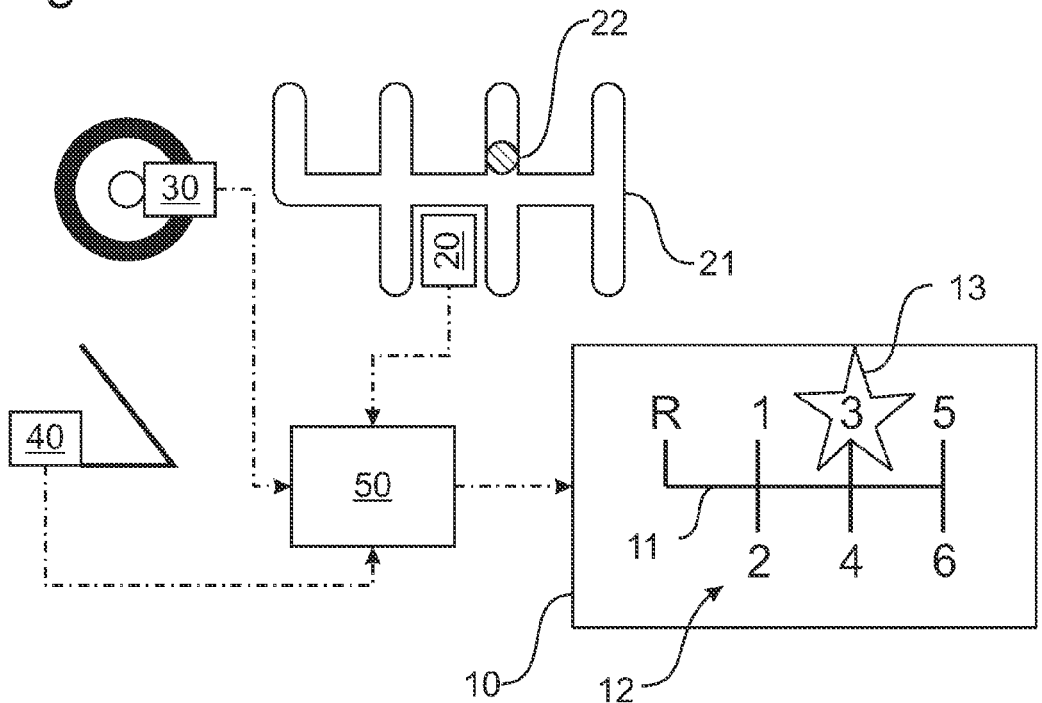
FIG. 1 illustrates a part of a motor vehicle with a device for carrying out a method according to an embodiment of the present disclosure.

The device includes a control device 50, in which a driver assistance system is implemented, and which is signal connected to a sensor 20 for detecting a position and, by calculating the difference, a movement of the gear selector lever 22 in the shifting gate 21, a sensor 30 for detecting a speed of the vehicle, and a sensor 40 for detecting an actuation of an accelerator and a clutch pedal of the vehicle, as indicated in dash-dotted line in FIG. 1. The control device 50 is additionally signal-connected to a display 10.

When the driver actuates the clutch pedal in order to perform a gear change, the control device 50 activates the display 10 which then shows a graphic 11 of the gear shift that is geometrically similar to the shifting gate 21. In other words, positions assigned to the individual gear stages are symbolized by corresponding numbers 12 for these gear stages.

Figure 2:
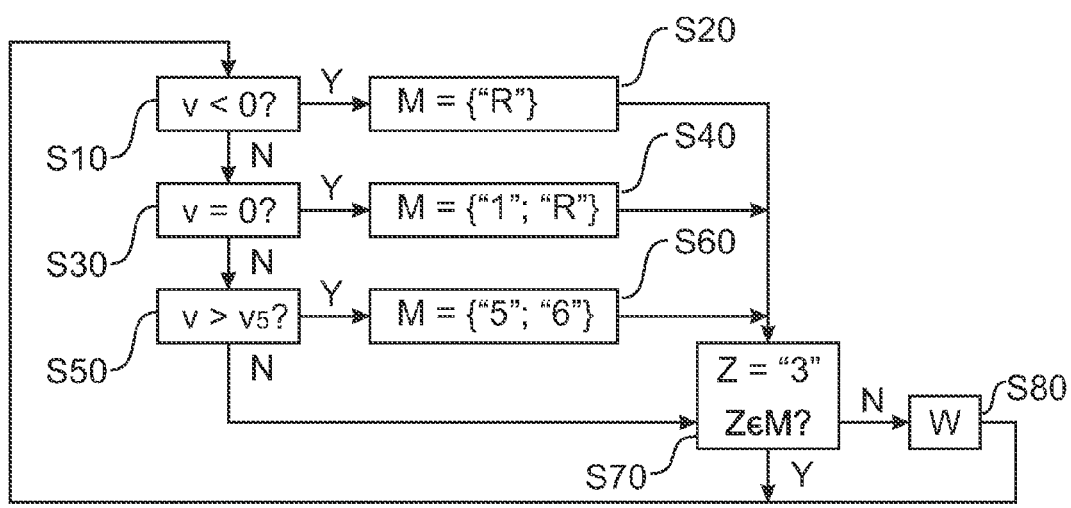
FIG. 2 shows the sequence of a method carried out by the device of FIG. 1 according to an embodiment of the present disclosure.

With reference now to FIG. 2, the control device 50 in a step S10 determines if the speed v of the vehicle detected by the sensors 30 is less than zero. If this is the case (S10: "Y"), only the reverse gear "R" is determined (S20: M={"R"}) in a step S20 as quantity M of the permissible end positions of the gear shift of the motor vehicle.

If by contrast this is not the case (S10: "N"), the control device 50 in a step S30 determines if the speed of the vehicle detected by the sensor 30 is equal to zero or the vehicle is stationary. If this is the case (S30: "Y"), the reverse gear "R" and the lowest first forward gear "1" is determined in a step S40 as quantity M of the permissible end positions of the gear shift of the motor vehicle (S40: M={"1"; "R"}).

If by contrast this is not the case (S30: "N"), the control device 50 in a step S50 determines if the speed of the vehicle detected by the sensor 30 exceeds a predetermined limit value $v_0$. If this is the case (S50: "Y"), the highest two forward gears "5" and "6" are determined in a step S60 as quantity M of the permissible end positions of the gear shift of the motor vehicle (S60: M={"5"; "6"}).

In this manner, the control device 50 determines a quantity M of the permissible end positions of the gear shift of the motor vehicle thus forming a means for determining a quantity of the permissible end positions of the gear shift.

Following this, the control device 50 in a step S70 detects a manual gear shift actuation and determines a target position of this manual gear shift actuation. The sensor 20 thus forms a means for detecting a manual gear shift actuation, and the control device 50 forms a means for determining a target position of the manual gear shift actuation.

In an exemplary embodiment, the sensor 20 detects that the selector lever in the shifting slot assigned to the third and fourth forward gear approaches the position assigned to the third forward gear. Accordingly, the control device 50 determines the same as target position Z (S70: "Z"="3") in step S70. The control device 50 then checks in step S70 if this target position Z belongs to the quantity M of the permissible end positions (S70: "Z∈M?").

If this is not the case (S70: "N"), the control device 50 outputs a warning W in step S80. To do so, it highlights the symbol in the graphic 11 of the display 10 corresponding to the impermissible target position with a warning symbol 13. It may additionally command a warning tone. If by contrast the target position Z belongs to the quantity M of the permissible end positions (S70: "Y"), this warning is omitted.

If the sensor 30 thus signals that the motor vehicle is stationary, the control device 50 warns the driver in the event that he erroneously would like to driver off in the third gear and to this end starts to move the gear selector lever 22 into the corresponding position.

Equally, in an embodiment, the control device 50 can determine the quantity M of the permissible end positions based on the detected current position of the gear selector 22, which for example in the shown exemplary embodiment the reverse gear because of the position of the gear selector lever 22 in the shifting slot of the shifting gate 21 assigned to the third and fourth forward gear does not include the reverse gear, so that the driver is warned against shifting from the third forward gear into the reverse gear.

Thus, the display 10 together with the control device 50 activating it forms a means for outputting a warning when the target position does not belong to the quantity of the permissible end positions.

Figure 3:
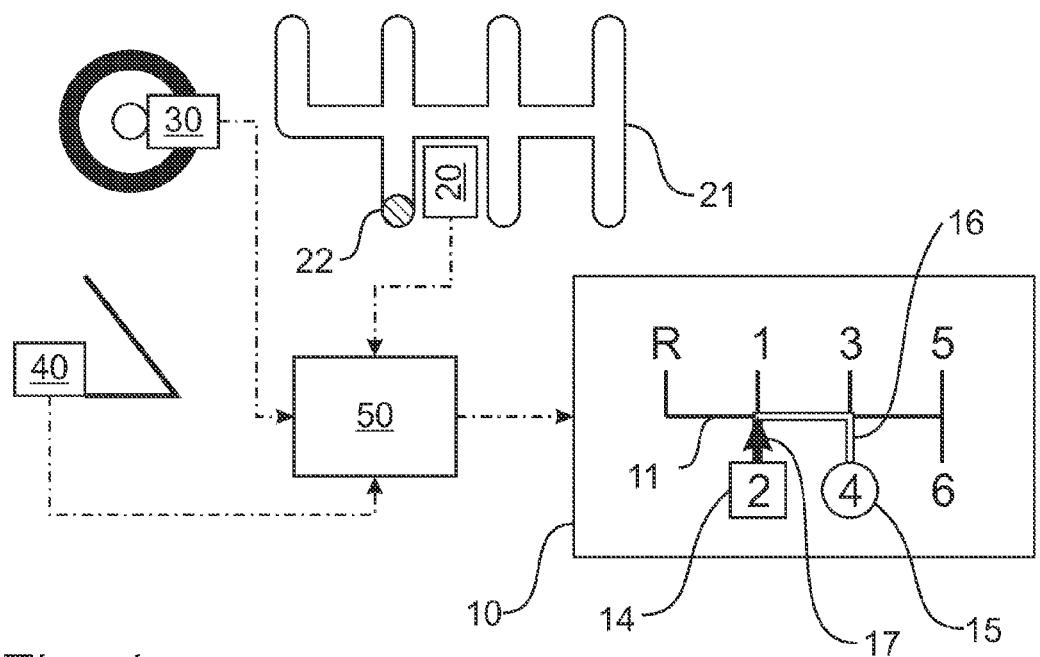
FIG. 3 illustrates the device of FIG. 1 when carrying out a step of a method according to a further embodiment of the present disclosure.
Figure 4:
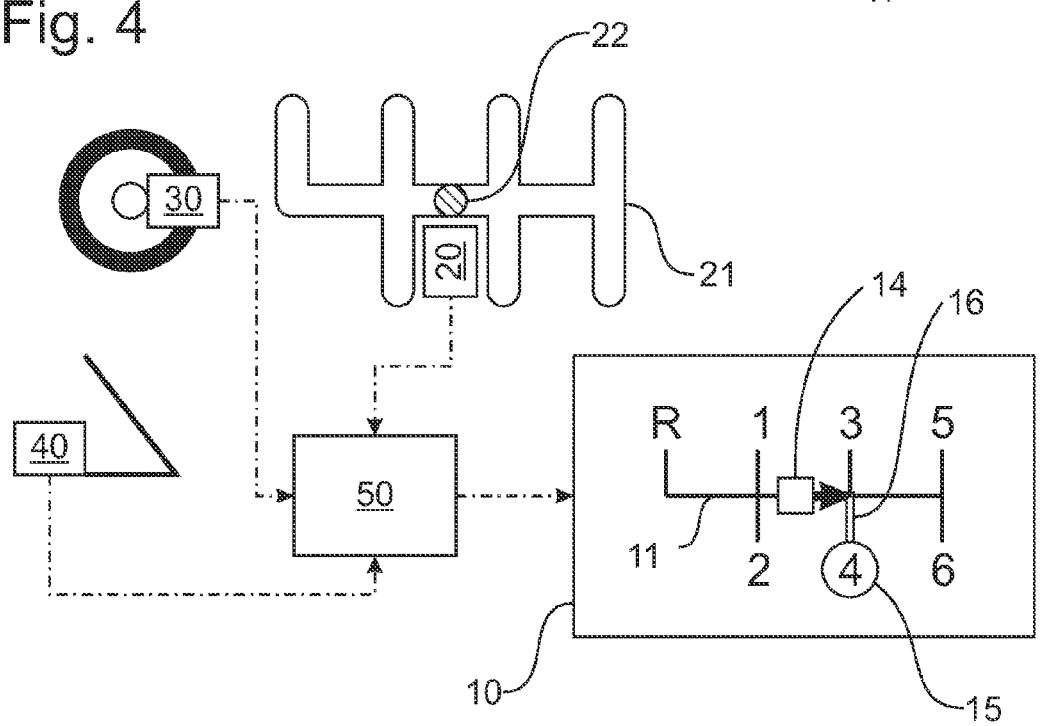
FIG. 4 illustrates the device of FIG. 3 when carrying out a further step of the method.

FIGS. 3 and 4 show the device of FIG. 1 while carrying out two steps of a method according to a further embodiment of the present disclosure.

Here, the driver assistance system, which is implemented in the control device 50, recommends based on the current gear detected by the sensor 20 and the vehicle speed detected by the sensor 30 a gear shift actuation of the gear shift from the second into the fourth forward gear. The control device 50 then determines as a function of this recommended gear shift actuation a gear shift movement path with a starting position which is assigned to the current position "2" of the gear shift, an end position, which is assigned to the recommended position "4" of the gear shift and a movement from this starting position "2" into this end position "4" along the shifting slot assigned to the second forward gear stage as far as into the selection slot, in the same just as far as to the shifting slot, which is assigned to the fourth forward gear stage, and in the same as far as to the position which is assigned to the fourth forward gear stage without in the process shifting into that of the third forward gear stage.

Following this, the control device 50 through appropriate activation of the display 10 indicates this gear shift movement path in the graphic 11 of the gear shift by exemplarily indicating the starting position by a rectangle 14, the end position by a circle 15 and the movement from the starting position into the end position by a line 16 and a directional arrow 17.

If the driver follows the instruction and moves the gear selector lever 22 initially into the selection slot of the shifting gate 21, the starting position 14 of the displayed gear shift movement path migrates with the current position of the gear selector lever 22, which is detected by the sensor 20, as indicated in FIG. 4. The directional arrow is also updated accordingly.

The graphic 11 and the gear shift movement path 14-17 are only displayed temporarily for as long as the driver assistance system of the control device 50 recommends the gear shift actuation, and the driver thus has not yet executed the same. Following this, the display 10 is again deactivated and only activated by a renewed recommendation of a gear shift actuation by the driver assistance system of the control device 50 or, as explained above with reference to FIGS. 1, 2, an actuation of the clutch pedal detected by the sensor 40 or an actuation of the gear selector 22 detected by the sensor 20.

By viewing this together, it is evident that the graphic 11 is designed geometrically similar to the gate 21 of the gear shift and the gear shift movement path 14-17 displayed on the graphic 11 is superimposed on the graphic 11.

The control device 50 through the implemented driver assistance system forms a means for determining the gear shift actuation, and a means for determining the gear shift movement path which includes the starting position 14, the end position 15 and the movement 16, 17 from the starting position into the end position, as a function of the gear shift actuation, the display 10 together with the control device 50 activating it a means for displaying the gear shift movement path 14-17 in the graphic 11 of the gear shift of the motor vehicle.

Figure 5:
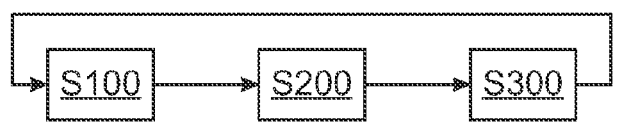
FIG. 5 shows the sequence of the method carried out by the device of FIG. 3.

This is symbolically shown in FIG. 5 at step S100, the control device 50, as described above, determines as a function of a current position of the gear selector lever 22 detected by the sensor 20 and the gear stage recommended by the driver assistance system a gear shift actuation of the gear shift of the vehicle, in a step S200 as a function of this gear shift actuation the gear shift movement path with the starting position 14, the end position 15 and the movement 16, 17 from the starting position into the end position, and in a step S300 shows through the display 10 the gear shift movement path 14-17 in the graphic 11 of the gear shift of the motor vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for supporting a driver of a motor vehicle comprising:
   determining a quantity of permissible end positions of a manual gear shift;
   detecting an actuation of the manual gear shift;
   determining a target position of the manual gear shift actuation; and
   outputting a warning before the gear shift is in the target position when the target position does not belong to the quantity of the permissible end positions.

2. The method according to claim 1, further comprising determining the quantity of the permissible end positions based on at least one of a detected speed of the motor vehicle and a detected current position of the gear shift.

3. The method according to claim 1, wherein the warning is selected from the group consisting of a visual warning, an audible warning, a haptic warning and combinations thereof.

4. The method according to claim 1, further comprising outputting the warning when the gear shift is in the target position.

5. A computer program product with a program code that is stored on a non-transitory computer readable medium for carrying out the method according to claim 1.

6. A method for supporting a driver of a motor vehicle comprising:

determining a quantity of permissible end positions of a manual gear shift
detecting an actuation of the manual gear shift
determining a target position of the manual gear shift actuation; and
determining a gear shift actuation of the manual gear shift;
determining a gear shift movement path including a starting position, an end position and a movement path from the starting position into the end position, as a function of the gear shift actuation;
displaying the gear shift movement path in a gear shift graphic; and
outputting a warning before the gear shift is in the target position when the target position does not belong to the quantity of the permissible end positions.

7. The method according to claim 6, further comprising determining the gear shift actuation based on at least one of a detected current position of the gear shift and a recommended end position of the gear shift determined based on a detected current position of the gear shift.

8. The method according to claim 6, wherein the graphic is temporarily displayed.

9. The method according to claim 6, wherein at least one of the graphic and the gear shift movement path is displayed as a function of at least one of an actuation of an actuator and a gear change recommendation of a driver assistance system of the motor vehicle.

10. The method according to claim 6, wherein the graphic is displayed on a windshield or an instrument panel of the motor vehicle.

11. The method according to claim 6, wherein the graphic is a geometric representation of a gate of the gear shift.

12. The method according to claim 6, wherein the displayed gear shift movement path comprises a directional symbol.

13. The method according to claim 6, wherein the gear shift movement path and graphic are superimposed one on the other.

14. The method according to claim 6, further comprising determining a current position of the gear shift and changing the starting position of the displayed gear shift movement path as a function of this current position while the gear shift movement path is displayed.

15. A computer program product with a program code that is stored on a non-transitory computer readable medium for carrying out the method according to claim 6.

* * * * *